US012684647B2

(12) United States Patent
Ross et al.

(10) Patent No.: US 12,684,647 B2
(45) Date of Patent: Jul. 14, 2026

(54) DYNAMIC INTER-REGION CONNECTION DISTRIBUTION TO 5G NETWORK FUNCTIONS

(71) Applicant: VERIZON PATENT AND LICENSING INC., Basking Ridge, NJ (US)

(72) Inventors: Brian D. Ross, Little Rock, AR (US); Madhan Muralimanohar, Tampa, FL (US); Calvin Waverley Bell, Dallas, TX (US); Stojan Dabic, North Little Rock, AR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 362 days.

(21) Appl. No.: 18/499,914

(22) Filed: Nov. 1, 2023

(65) Prior Publication Data

US 2025/0142660 A1     May 1, 2025

(51) Int. Cl.
    *H04W 76/25*      (2018.01)
    *H04W 68/00*      (2009.01)

(52) U.S. Cl.
    CPC ......... *H04W 76/25* (2018.02); *H04W 68/005* (2013.01)

(58) Field of Classification Search
    None
    See application file for complete search history.

(56) References Cited

U.S. PATENT DOCUMENTS

2020/0314004 A1 * 10/2020  Rashad .................. H04L 45/74
2024/0187472 A1 *  6/2024  Shringi ................. H04L 65/80
2025/0220403 A1 *  7/2025  Smith .................... H04W 4/70
2025/0343832 A1 * 11/2025  Li .......................... H04L 67/10

* cited by examiner

*Primary Examiner* — Walter J Divito

(57) ABSTRACT

The disclosed embodiments involve recording performance metrics for network connections in a centralized database, storing network connection data in a global registry across multiple data centers, detecting backlogs at specific data centers linked to network elements and connections, and generating updated connection assignments. These assignments include identifiers for the involved data centers and connections. Upon receiving a connection assignment update notification, the method updates the network connection and communicates the first data center's connection state to the global registry.

20 Claims, 7 Drawing Sheets

DYNAMIC INTER-REGION CONNECTION DISTRIBUTION TO 5G NETWORK FUNCTIONS

BACKGROUND

Cellular networks utilize numerous network connections. For example, in a 5G cellular network, various devices and network functions establish network connections to transmit data, i.e., to provide voice and data services. Frequently, connections are provisioned by a provisioning system in a given data center. As the volume of transactions increases, the number of connections between network elements increases to handle the load. In some scenarios, the number of connections can impact the performance of the network and it is desirable to redistribute connections.

DETAILED DESCRIPTION

Figure 1:
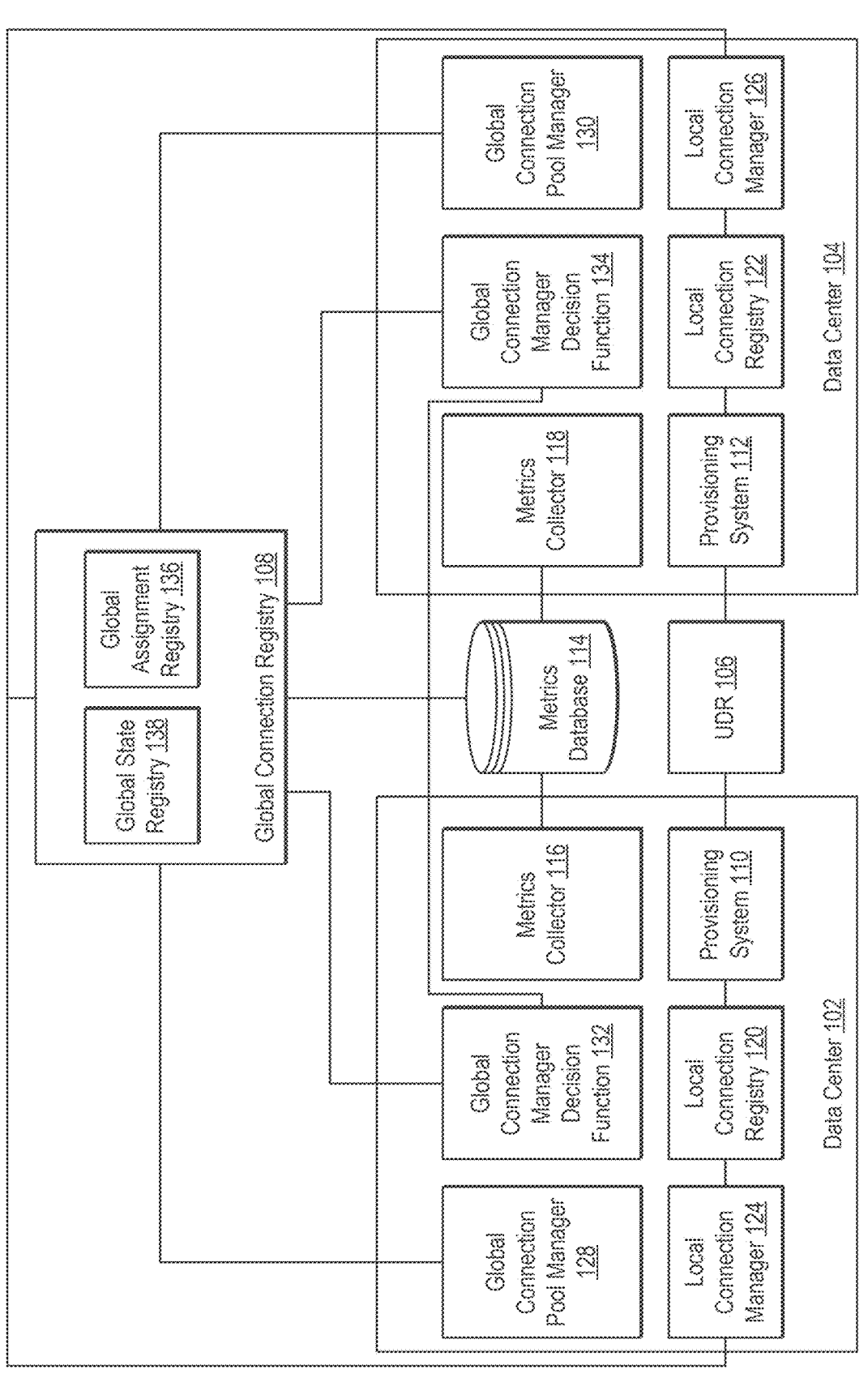
FIG. 1 is a block diagram illustrating a connection management system of a network according to some of the disclosed embodiments.

The disclosed embodiments are directed to management of network connections in a computing environment that includes multiple regions and data centers therein.

Cellular networks utilize multiple data centers to provide network and computing functionality to provide data and voice services to subscribers. During operation of the network, provisioning systems of the data centers can be utilized to setup and tear down network connections between endpoints. As used herein, a connection may refer to a network communications path between two end points. In some implementations, this network communications path can be a long-lived path and/or a temporary path. In some implementations, the endpoints may include network elements within a cellular network. For example, 5G network functions (NFs) may comprise the network elements and the connections may comprise the communications paths between these network elements. Alternatively, or in conjunction with the foregoing, the endpoints can include physical devices. In some implementations, an end point can include user equipment (UE) or similar devices. As one example, two or more network elements can be communicatively coupled via connections when a subscriber is provisioned for wireless connectivity. Thus, the provisioning system is responsible for managing such connections.

In some networks, connections are manually distributed across data centers to prevent overloading one or more data centers based on the number of connections required. However, many cellular networks still rely on the manual (i.e., human) porting of connections from one data center to another in the event that a data center is overloaded. For example, if a data center experiences an increased demand for transaction volume resulting in an increased number of connections, operators of the network may manually tear down connections and re-establish those connections in a different data center to handle the new connection requests. Such an approach is time-consuming and necessarily introduces downtime to the network, reducing the throughput and effectiveness of the network as a whole.

As one example, a 5G cellular network may include a unified data repository (UDR) which stores information including, but not limited to, wireless subscriber data, policy data, application data, etc. A data center may include a UDR connection pool which manages the network connections between network elements in the data center and the UDR. For example, these network elements may include, but are not limited to, a unified data management (UDM) network element, access and mobility management function (AMF), session management function (SMF), network exposure function (NEF), policy control function (PCF), application functions (AFs) (e.g., Voice over LTE), etc. Multiple data centers thus maintain their own UDR connection pools. If an operator desires to move some UDR connections from a first data center to a second data center, the operator must first stop the UDR connections on the first data center, introducing application downtime (to avoid traffic disruption), and then start the connections on the second data center, restoring application uptime. The ordering of these operations is also crucial to avoid network instability (e.g., provisioning duplicate connections).

In the disclosed embodiments, the disclosed techniques pertain to a method that involves several steps. These steps include recording performance metrics associated with network connections between network elements in a centralized database, storing data that represents multiple network connections in a global connection registry. These network connections are provisioned across several data centers. The method also entails identifying a backlog at a specific data center, associated with a network element and a network connection selected from the multiple network connections, and generating an updated connection assignment for this network connection. This updated connection assignment contains identifiers for the first data center, the network connection, and a second data center. Upon receiving a connection assignment update notification from the global connection registry, the method proceeds to update the network connection and transmit the connection state of the first data center to the global connection registry in response to the connection assignment update notification.

In some implementations, the techniques encompass a method wherein performance metrics include metrics like queue counts for connection requests associated with each network element, throughput measurements for each network element, and the average time required to fulfill connection requests for each network element.

Furthermore, the method can involve detecting the backlog by retrieving a subset of the performance metrics from the centralized database and analyzing this subset to compute the backlog. The backlog computation is based on metrics such as queue counts, throughput, or average time required to complete connection requests for network elements linked to the first data center.

The method can also incorporate a connection distribution decision function that is distributed across the first data center and the second data center. The selection of the second data center is determined through this function, often based on factors like the provisioning volume of the second data center.

When updating the network connection in response to the connection assignment update notification, the method includes several steps. It starts by instructing a local connection registry of the first data center to update the desired connection state, then proceeds to update the network connection via a provisioning agent, followed by updating the local connection state of the first data center. The method determines that the local connection state aligns with the desired connection state before transmitting a connection state update notification to a local connection manager, indicating the successful completion of the network connection update.

Additionally, the techniques extend to computing a global connection state using the connection state of the first data center, comparing this global connection state to the desired global connection state to identify mismatches, transmitting a second connection assignment update notification to the second data center, and subsequently updating at least one second connection at the second data center in response to the second connection assignment update notification.

Furthermore, the disclosed techniques are also applicable to non-transitory computer-readable storage mediums, where computer program instructions are stored and executed by a computer processor, and devices equipped with processors configured to perform the specified steps as outlined in the method.

FIG. 1 is a block diagram illustrating a connection management system of a network according to some of the disclosed embodiments.

In some implementations, the system includes a first data center 102 and a second data center 104. While only two data centers are illustrated, no limit is placed on the number of data centers. Indeed, as will be discussed, each data center may include the same or similar components and thus be extendible to an arbitrary number of data centers.

Each data center (e.g., first data center 102, second data center 104) typically comprises a network of computing devices and storage units, interconnected via high-speed communication channels. These data centers can house various infrastructure elements, such as servers, routers, switches, and storage arrays, configured to provide processing and storage capabilities. The computing devices may include, but are not limited to, application servers, database servers, and load balancers, which collaborate to deliver various services. Further, the data centers may implement various network functions to form a cellular network, as will be discussed. Various components of first data center 102 are described in more detail herein. As illustrated, second data center 104 may include components that perform the same or similar functions and the descriptions of those devices in second data center 104 is not repeated for the sake of clarity. For example, metrics collector 116 and metrics collector 118 may perform the same or similar functions, provisioning system 110 and provisioning system 112 may perform the same or similar functions, local connection registry 120 and local connection registry 122 may perform the same or similar functions, local connection manager 124 and local connection manager 126 may perform the same or similar functions, global connection manager decision function 132 and global connection manager decision function 134 may perform the same or similar functions (when in active mode, described more herein), and global connection pool manager 128 and global connection pool manager 130 may perform the same or similar functions.

In some implementations, the system includes a global connection registry 108. In some implementations, global connection registry 108 comprises a centralized database or other storage mechanism for storing connection data received from the data centers. In some implementations, global connection registry 108 can be implemented as a single device and/or at a single location or data center. In some implementations, global connection registry 108 is configured to track connection distribution across application data centers by receiving updates regarding connection statuses from individual data centers.

In some implementations, global connection registry 108 can include a global connection state registry 138 and a global connection assignment registry 136. In some implementations, global connection state registry 138 can comprise a storage device (e.g., database, etc.) to store the current state of connections across all data centers. In some implementations, global connection state registry 138 operates as a central repository for connection information. It stores data related to active connections, their statuses, and associated metadata. This data includes details about the endpoints involved, communication protocols, connection duration, and any other relevant parameters. The storage device employed, which may be a distributed database, NoSQL database, or similar technology, is highly scalable and fault-tolerant, capable of handling large volumes of connection state data efficiently.

In some implementations, global connection assignment registry 136 can comprise a storage device (e.g., database, etc.) to store the desired state of connections across all data centers. In some implementations, the desired state of connections can be built by receiving a requested update from a global connection pool manager and processing all connection states to implement the requested update. The desired state can represent the configuration and distribution of connections that the network aims to achieve. It can be, in essence, a blueprint for connection allocation and load balancing. The global connection assignment registry 136 can serve as the authoritative source for maintaining and implementing this desired state. In some implementations, the process of building the desired state of connections begins with a request from a global connection pool manager which formulates a requested update to the desired state based on these inputs. Once a requested update is received, the global connection registry 108 can process existing connection states, evaluating their current configurations and statuses. It can then implement the requested update by reassigning connections as necessary to align with a desired state. The result of this process, the global state of connections after implementing the requested update, is referred to as the "desired state" of connections. This state represents the distribution and allocation of connections across the network, optimized for performance, fault tolerance, and resource utilization.

First data center 102 includes a global connection pool manager 128. In some implementations, global connection pool manager 128 is communicatively coupled to global connection registry 108 and can transmit connection assignment requests to global connection registry 108 based on a decision made by global connection manager decision function 132. In some implementations, the global connection pool manager 128 orchestrates reconciliation of local provisioning instance connections with connection assignments from global connection registry 108.

In some implementations, global connection manager decision function 132 executes decision functions to determine when network element connections need to be moved between data centers. Global connection manager decision function 132 can retrieve global metrics from a centralized data store (metrics database 114). In some implementations, metrics collectors (e.g., metrics collector 116) at each data center monitor the connections managed by the data center provisioning system(s) and transmit metrics for long-term storage in metrics database 114. Details of these metrics are described further herein. Global connection manager decision function 132 can load metrics, parse and analyze the metrics, detect triggering conditions, and transmit connection assignments to the global connection registry 108, after which the global connection pool manager 128 will reconcile the current connection state (as stored in global connection state registry 138) with a proposed assignment in global connection assignment registry 136 to determine how connections should be transferred. In some implementations, the global connection manager decision function 132 is distributed across all data centers (e.g., as illustrated with global connection manager decision function 134, which is illustrated in "standby" mode). In some implementations, a leader election algorithm can be used across all decision functions to select an active leader (e.g., global connection manager decision function 132) for performing the above functions.

As discussed, the global connection manager decision function 132 will analyze metrics stored in metrics database 114 and transmit proposed connection assignment changes or transfers to global connection registry 108. As discussed, global connection pool manager 128 will resolve this change (e.g., detect mismatches) with the current state and generate a proposed change in connection assignments. Global connection registry 108 can then transmit a message to each global connection pool manager (e.g., global connection pool manager 128 and global connection pool manager 130) reflecting the desired state of the system. Each global connection pool manager 128 will transmit the required connection assignments (e.g., first data center 102 may generate a connection assignment removing a connection while second data center 104 may generate a connection assignment adding a connection) to the global connection registry 108. In response, global connection registry 108 will transmit the connection assignments to the corresponding local connection managers (e.g., local connection manager 124 or local connection manager 126, corresponding). In some implementations, the global connection registry 108 can synchronously issue these changes, ensuring that the proper order of assignments is performed (as discussed later herein).

Local connection manager 124 listens for local connection assignment changes in global connection registry 108 and performs reconciliation of connection assignments for provisioning system 110. In a cellular network, provisioning system 110 comprises one or more computing devices performing a range of functions related to the operation and management of a cellular network. It includes elements such as network configuration management, subscriber provisioning, and resource allocation. As illustrated, provisioning system 110 can be used to establish and manage connection to UDR 106. UDR 106 represents a central and consolidated data store that houses a wide array of information, such as customer data, transaction records, or other relevant data sets.

Provisioning system 110 can include a provisioning agent (not illustrated) that communicates with network elements using connection assignments received from local connection registry 120. In some implementations, local connection registry 120 is similar to global connection registry 108 but stores only connections managed by provisioning system 110. Local connection registry 120 can track connection distribution across multiple provisioning agents within first data center 102 and provisioning system 110. Further, local connection registry 120 can include a connection state registry that contains the current state of connections across provisioning agent instances as well as a connection assignment registry that can contain the desired state of connections across provisioning agent instances.

In response to a connection assignment notification, the local connection manager 124 can update the connection assignments in local connection registry 120. Similar to the process of global connection pool manager 128, the local connection manager 124 can resolve a mismatch between the proposed connection assignment and current state and, differing from global connection registry 108, can directly issue a command to provisioning system 110 (via a provisioning agent) to update a connection. For example, local connection manager 124 can issue a command to the provisioning system 110 to cause the provisioning system 110 to close one or more connections or open one or more connections. In some implementations, local connection registry 120 can provide the connection details needed to perform the requested operation. After completing the operation, the provisioning system 110 can notify the local connection registry 120 which can update the local connection state. In response, the local connection registry 120 can transmit the updated state to local connection manager 124 which can update the global connection registry 108 accordingly. In some implementations, discussed herein, the global connection registry 108 can then update the global state registry and, if needed, issue further connection assignments after resolving the desired state. For example, the above process can be repeated for second data center 104 to create (versus close) connections, thus effectuating a transfer.

Figure 2:
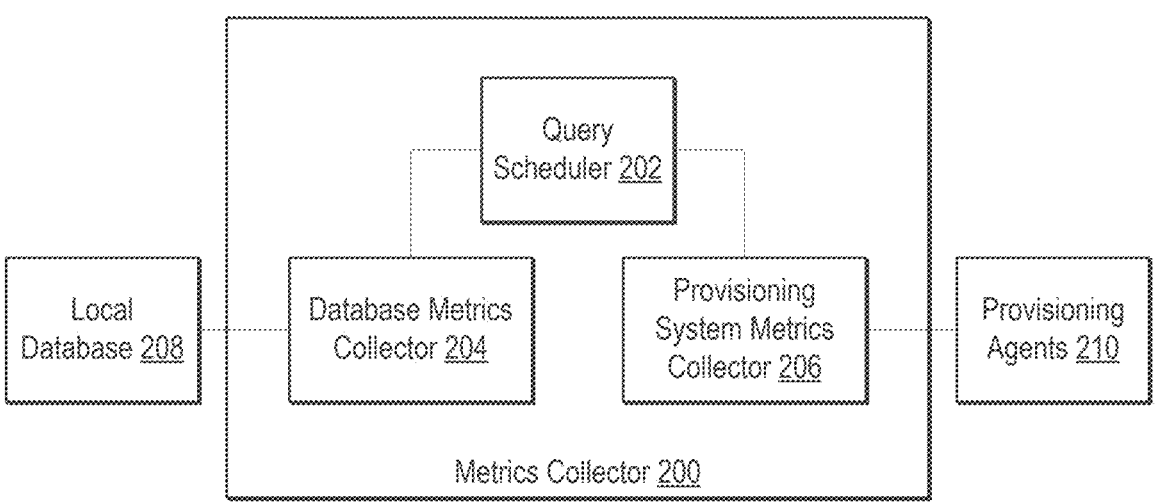
FIG. 2 is a block diagram illustrating a metrics collector according to some of the disclosed embodiments.

FIG. 2 is a block diagram illustrating a metrics collector according to some of the disclosed embodiments.

As discussed, metrics collector 200 may be implemented at each data center in a cellular network. Metrics collector 200 includes a query scheduler 202 that is communicatively coupled to a database metrics collector 204 and a provisioning system metrics collector 206. Database metrics collector 204 may communicate with a local provisioning database 208 while provisioning system metrics collector 206 may communicate with a provisioning agent 210. In some implementations, query scheduler 202 schedules metrics collection queries to issue to both database metrics collector 204 and provisioning system metrics collector 206. In response to such a query, database metrics collector 204 may collect metrics from local provisioning database 208 and push them to a centralized metrics database (e.g., metrics database 114). Correspondingly, provisioning system metrics collector 206 may collect metrics from provisioning agent 210 and push them to a centralized metrics database (e.g., metrics database 114).

In some implementations, the metrics collected include a demand metric. In some implementations, the demand metric corresponds to a network element queue count grouped by priority. In some implementations, the metrics collected can include a supply metric. In some implementations, the supply metric corresponds to a network element throughput. In some implementations, the metrics can also include an average time required to complete network requests. In some implementations, these metrics can be collected across all network elements associated with connections provisioned by the provisioning system.

Query scheduler 202 can act as an orchestration hub for collecting metrics related to connection provisioning in a data center (e.g., by a provisioning agent 210). Query scheduler 202 may implement a scheduling algorithm to determine the timing and frequency of metrics collection queries. Examples of such algorithms can include, but are not limited to, periodic polling, where queries are sent at regular intervals, and event-driven triggering, which initiates queries based on predefined events or conditions. The choice of scheduling algorithm depends on various factors, including the update frequency of the data being collected and the specific network requirements. In some implementations, query scheduler 202 can prioritize queries to database metrics collector 204 and provisioning system metrics collector 206 based on the type of metrics queried to ensure key metrics are captured quickly while delaying less critical metrics. In some implementations, query scheduler 202 can also communicate with both the database metrics collector 204 and provisioning system metrics collector 206 using established communication protocols, such as HyperText Transfer Protocol (HTTP), Representation State Transfer (REST), or custom application programming interfaces (APIs, to facilitate data exchange.

In some implementations, database metrics collector 204 can retrieve gathering metrics from the local provisioning database 208. Database metrics collector 204 can establish a secure and reliable connection to the local database using appropriate database connectors. The choice of connector depends on the type of database in use, such as Java Database Connectivity (JDBC) connectors for relational databases or connectors for NoSQL databases. In some implementations, database metrics collector 204 can structure queries in a structured query language (SQL) dialect, though the choice of query language depends on the type of database being accessed. Data mapping routines may be used to standardize the collected metrics and ensure uniformity. This can ensure that metrics are collected consistently and can be easily compared and analyzed. Database metrics collector 204 can utilize a push mechanism to transmit the collected metrics to a centralized metrics database (e.g., metrics database 114). This may involve the use of RESTful APIs, message queues, or other data transfer methods. Database metrics collector 204 may include data validation processes to verify the accuracy and completeness of the collected data before it is pushed to the centralized metrics database.

Provisioning system metrics collector 206 can retrieve performance metrics associated with the provisioning system. In some implementations, provisioning system metrics collector 206 can establish a communication channel with the provisioning agent 210 through various protocols, such as RESTful APIs, message queues, or custom interfaces. Provisioning system metrics collector 206 can then generate and issue metrics collection queries designed to retrieve specific provisioning system-related metrics. These queries are tailored to the provisioning agent's capabilities and data structure, allowing for targeted data extraction. Furthermore, provisioning system metrics collector 206 can perform data mapping and transformation routines to align the collected metrics with a standardized format required by the centralized metrics database (e.g., metrics database 114), ensuring uniformity and comparability.

Local provisioning database 208 can serve as a local repository for storing data related to connection provisioning within the data center. In some implementations, local provisioning database 208 houses information for the provisioning process. Local provisioning database 208 may store a diverse set of data, including connection configurations encompassing parameters, endpoints, and service-specific settings, as well as user and device data, such as subscriber profiles and authentication information. Moreover, local provisioning database 208 can store information about network element queues, connection priorities, provisioning history, network element statuses, and performance metrics, facilitating informed decision-making for connection routing and resource allocation. Additionally, local provisioning database 208 can store configuration policies and rules that guide the provisioning process, dictating aspects such as load balancing, failover mechanisms, and quality of service.

Provisioning agent 210 can store and return data in response to queries related to the provisioning and management of connections within the cellular network. This data primarily focuses on the real-time status and configuration of connections. For instance, provisioning agent 210 can provide information about the status of connections, including whether they are currently active, pending, or terminated. Additionally, the response may include details about the provisioned connections, encompassing connection parameters, endpoints, and service specifications. Provisioning agent 210 can also return performance metrics relevant to the provisioned connections, such as connection latency, throughput, and error rates. Provisioning agent 210 can also return queue and priority information, such as the number of pending requests in network element queues and priority levels. Provisioning agent 210 can also return event logs, documenting the history of provisioning activities. Finally, provisioning agent 210 can also store and return data about the network elements involved in provisioning, assisting in understanding the network's infrastructure and capacity.

Figure 3:
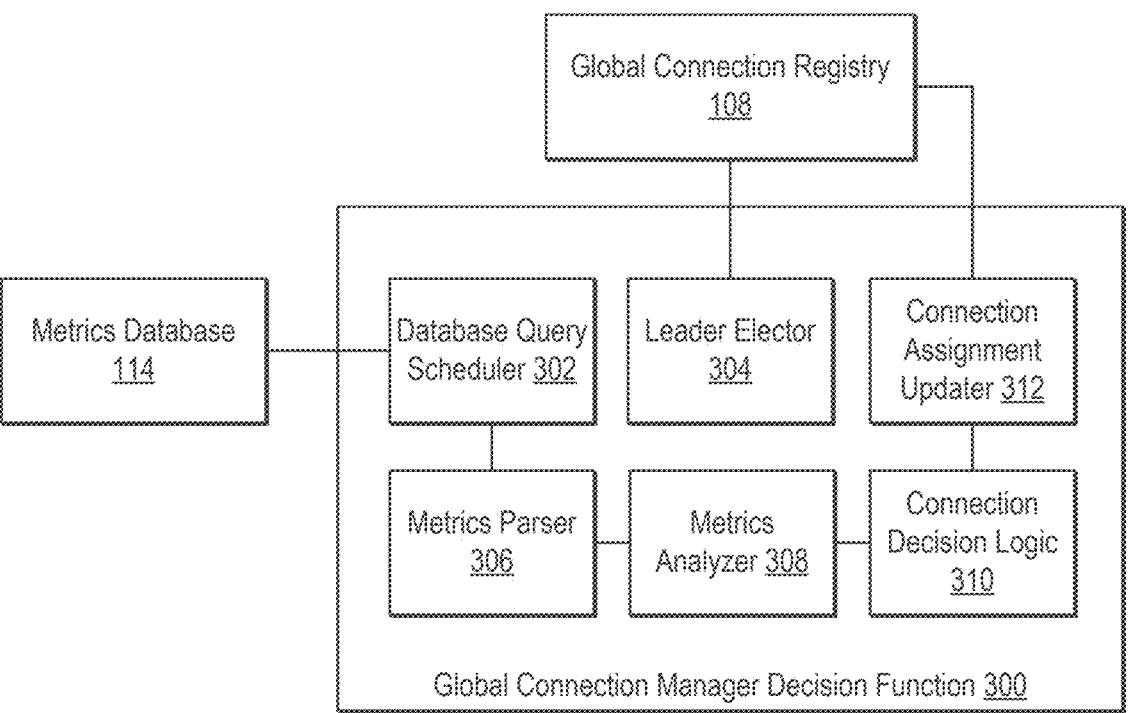
FIG. 3 is a block diagram illustrating a global connection manager decision function according to some of the disclosed embodiments.

FIG. 3 is a block diagram illustrating a global connection manager decision function according to some of the disclosed embodiments.

In the illustrated implementation, the global connection manager decision function 300 comprises a plurality of subcomponents. Specifically, it includes a database query scheduler 302, a metrics parser 306, metrics analyzer 308, connection decision logic 310, a connection assignment updater 312, and the leader elector 304.

In the illustrated implementation, the database query scheduler 302 periodically queries the metrics database 114. In some implementations, the database query scheduler 302 can perform these queries at regular intervals, such as every hour. Additionally, the database query scheduler 302 receives metrics from the metrics database 114. In some implementations, the database query scheduler 302 can receive volume backlog data and other volume statistics related to the connections managed by the specific data center to which the global connection manager decision function 300 belongs.

In some implementations, the database query scheduler 302 forwards the raw metrics to the metrics parser 306. This metrics parser, in turn, can conduct preprocessing on the raw metrics that are stored in metrics database 114. Its role is to format these raw metrics into a suitable format for analysis. For instance, the metrics parser 306 may carry out initial aggregation of metrics, deduplication, data filling, format conversion, unit conversion, or similar functions to prepare the data. Subsequently, the parsed metrics are passed on to the metrics analyzer 308.

In some implementations, the metrics analyzer 308 conducts a secondary analysis of the metrics, generating higher-level statistics for both the data center housing the global connection manager decision function 300 and all other data centers in the network. Initially, the metrics may comprise per-connection metrics. The metrics analyzer 308 then proceeds to perform a further aggregation of these raw metrics, grouping them by network element to analyze the volume backlog or provisioning volume of each network element. This analysis is carried out for every network element present in the metrics database 114. Subsequently, the metrics analyzer 308 conveys its analysis to the connection decision logic 310.

In some implementations, the connection decision logic 310 conducts further analysis on the insights provided by the metrics analyzer 308 to make decisions based on this analysis. This decision logic is equipped with one or more rules or conditions that can be evaluated against the analysis performed by the metrics analyzer 308. For instance, the connection decision logic 310 may encompass rules that dictate actions when a network element provisioning backlog is detected in a particular data center. In such cases, the logic identifies a different data center capable of accommodating the backlog. For instance, it may search for a data center with a low provisioning volume, indicating its ability to handle connections transferred to the backlogged network element in the first data center. The connection decision logic 310 can also consider priority levels of network elements experiencing a backlog. Higher-priority network elements may have lower backlog thresholds that the connection decision logic 310 employs to determine whether they should be transferred to another data center. Consequently, two network elements experiencing the same connection backlog may or may not be moved to another data center, depending on their priority levels.

Alternatively, or in conjunction with the foregoing, the connection decision logic 310 may employ a predictive model, such as a machine learning model that includes a neural network, to proactively assess when a network element might be susceptible to a connection backlog. In this implementation, the predictive model is trained using historical connection volumes, which are subsequently labeled based on whether the network elements associated with these historical connection volumes encountered a backlog. Consequently, the predictive model can take a current backlog for a particular network element and forecast whether it is likely to experience a backlog within a predefined forecast window.

Once the connection decision logic 310 determines that a modification in connection assignments is warranted, it communicates this decision to the connection assignment updater 312. In some implementations, the connection assignment updater 312 receives the desired change from the connection decision logic 310 and generates a data structure or payload representing this change. This data structure or payload may encompass a serialized form of the change, incorporating connection particulars, source data center details, and target data center details. For example, it might include one or more connection identifiers, an identifier for the donor data center, and an identifier for the receiving data center. Subsequently, as depicted, the connection assignment updater 312 transmits this connection assignment update to the previously described global connection registry 108.

As depicted, the global connection manager decision function 300 incorporates a leader elector 304. In some implementations, each instance of the global connection manager decision function 300 includes its own leader elector 304. These leader electors may engage in communication with other leader electors and various data centers through the global connection registry 108. To establish which leader elector takes on the active role, these leader electors often employ a leader election algorithm. As illustrated in FIG. 3, the leader elector 304 is currently designated as active after the leader election algorithm process. In some implementations, when the leader elector 304 assumes the active status, it enables or disables the operations of the global connection manager decision function 300. Consequently, when the leader elector 304 is active, the aforementioned operations are carried out at a particular data center. Conversely, when the leader elector is inactive, the global connection manager decision function 300 remains dormant and does not execute these operations. Subsequently, when the leader elector 304 becomes active again after a defined period, the global connection manager decision function 300 resumes its operations. This mechanism enables the global connection manager decision function 300 to function as a distributed process that can be executed by any data center within the network. Consequently, as mentioned earlier, a single data center's global connection manager decision function 300 can generate connection assignments for all connections managed within the network.

Figure 4:
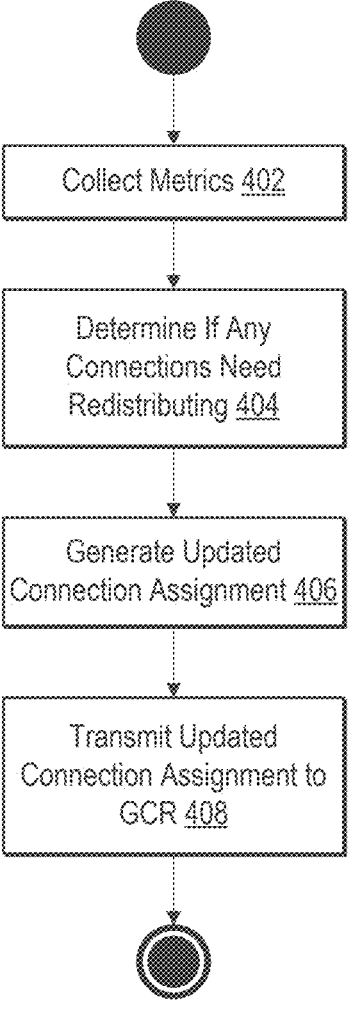
FIG. 4 is a flow diagram illustrating a method for initiating a connection transfer according to some of the disclosed embodiments.

FIG. 4 is a flow diagram illustrating a method for initiating a connection transfer according to some of the disclosed embodiments.

In step 402, the method can include collecting metrics regarding connections used in data centers across a network.

As described previously, each local provisioning system of a data center can generate metrics regarding the connections handled by the data center via the local provisioning system.

For instance, these metrics may encompass queue counts for each network element grouped by priority. Additionally, in some implementations, they can encompass the incoming transaction rate for each network element. This incoming transaction rate, along with the queue count for these transactions, can serve as an indicator of the provisioning capacity of a network element. Alternatively, the metrics may involve throughput measurements for each network element. They can also include the count of connections managed by a network element. In some implementations, the number of connections, coupled with the corresponding throughput, can offer insights into the provisioning capacity of a network element. Furthermore, the metrics may comprise the average time required to fulfill requests for each network element, with this average time providing indications of the network element's health in some implementations.

Indeed, in some implementations, these metrics can be periodically sampled by each data center over time and then sent to a central metrics database for long-term storage. In some scenarios, step 402 can be executed concurrently and continuously while data centers are active. Moreover, the centralized database might retain metrics data for a defined period in the past. For instance, it may store a maximum of one week's worth of metrics data collected by the data centers. However, it's important to note that in other settings, the precise time limitation is not necessarily limiting.

In step 404, the method can include analyzing metrics recorded by data centers and determining if any network element connections should be redistributed.

As described in FIG. 3, a global connection manager decision function may become active in a particular data center following the execution of a leader election algorithm. This decision function retrieves metrics from a designated time period in the past and conducts an analysis of these metrics to ascertain if any connections require redistribution. More precisely, the decision function receives metrics spanning the entire network and encompassing multiple data centers. Subsequently, it evaluates whether there is a necessity to redistribute connections for any network elements.

In some implementations, the decision function can employ rules or constraints to establish whether a connection requires relocation. For instance, the method may analyze each network element and identify those network elements that are encountering a backlog. This backlog for a network element can be calculated by assessing the metrics that describe its provisioning capacity in relation to its provisioning demand. In essence, a network element with limited capacity and substantial demand may be classified as having a backlog. Alternatively, fewer metrics may suffice to reach such a conclusion. For instance, the queue count, which signifies the number of pending requests awaiting processing by a particular connection, can serve as an indicator of backlog. Naturally, the decision function may utilize any combination of metrics recorded to determine whether a network element is facing a backlog.

In step 406, the method can include generating an updated connection assignment based on the decision made in step 404.

In some implementations, the method may determine one or more connections in step 404 that should be redistributed based on the capacity, demand, and health of the network elements within the network. Specifically, after identifying that a network element is encountering a backlog or another adverse condition, the method can then identify the connections managed by that network element. Subsequently, the method can then dynamically determine a number of those connections that should be redistributed to another network element.

For instance, as previously mentioned, a provisioning agent can establish multiple connections with a UDR. If, during step 404, the method determines that a specific provisioning agent is experiencing a backlog, as indicated by a queue count or a similar measure discussed earlier, the method can proceed to identify all the connections managed by that provisioning agent and the UDR. As discussed, these connections may be assigned distinct numbers to facilitate their identification.

In some implementations, step 406 can further include determining the number of connections to be redistributed. In one implementation, the method may include all connections of the affected network element. However, in other implementations, the method may select a subset of the connections managed by the affected network element. In these cases, the method can include determining the optimal number of connections to be relocated from the affected network element. This determination can be accomplished by simulating the impact on capacity and demand if a particular connection were to be removed. Such simulations may take into consideration the size of the connections managed by the affected network element. Consequently, in some implementations, the method can determine the optimal number of connections that can be transferred from the affected network element to achieve a target throughput. Furthermore, this simulation can be concurrently conducted on multiple affected network elements in some implementations.

In some implementations, the method may additionally determine a target data center to which the connection should be relocated. As the decision function acquires metrics from across the network, it can identify data centers that are currently experiencing low provisioning volumes. In such implementations, the method may rank data centers based on their provisioning volume and designate the data center with the lowest provisioning volume as the receiving data center for a connection assignment update (discussed subsequently). After selecting the receiving data center from the list, the method may also include updating a simulation of the receiving data center to incorporate the new connections, followed by a reevaluation of the list of data centers. This approach enables the method to choose the data center with the lowest provisioning volume for each affected network element while accounting for the potential consequences on future connection redistributions.

Following the determination of the number of connections, the method can include generating a connection assignment update. In some implementations, this connection assignment update can take the form of a serialized format that encapsulates the requested alterations to connections within the network. In some implementations, the connection assignment update may include the identities of the connections slated for modification, the current data center managing the connection, and the target data center to which the connections should be relocated. As previously mentioned, each connection is typically assigned a unique number, simplifying its representation in the assignment update. Moreover, each data center may have a distinctive identifier, thereby facilitating the identification of both donor and receiving data centers.

In step 408, the method can then include transmitting the updated connection assignment to a global connection registry. As discussed, the global connection registry comprises a centralized registry of connections across the network. Thus, the global connection registry can receive the updated connection assignment and initiate an update to the connections across the network. Details of this process are described next in FIGS. 5 and FIGS. 5 and 6 are sequence diagrams illustrating a method for transferring an active connection from a donor data center (DC2) to a receiving data center (DC1) according to some of the disclosed embodiments.

Figure 5:
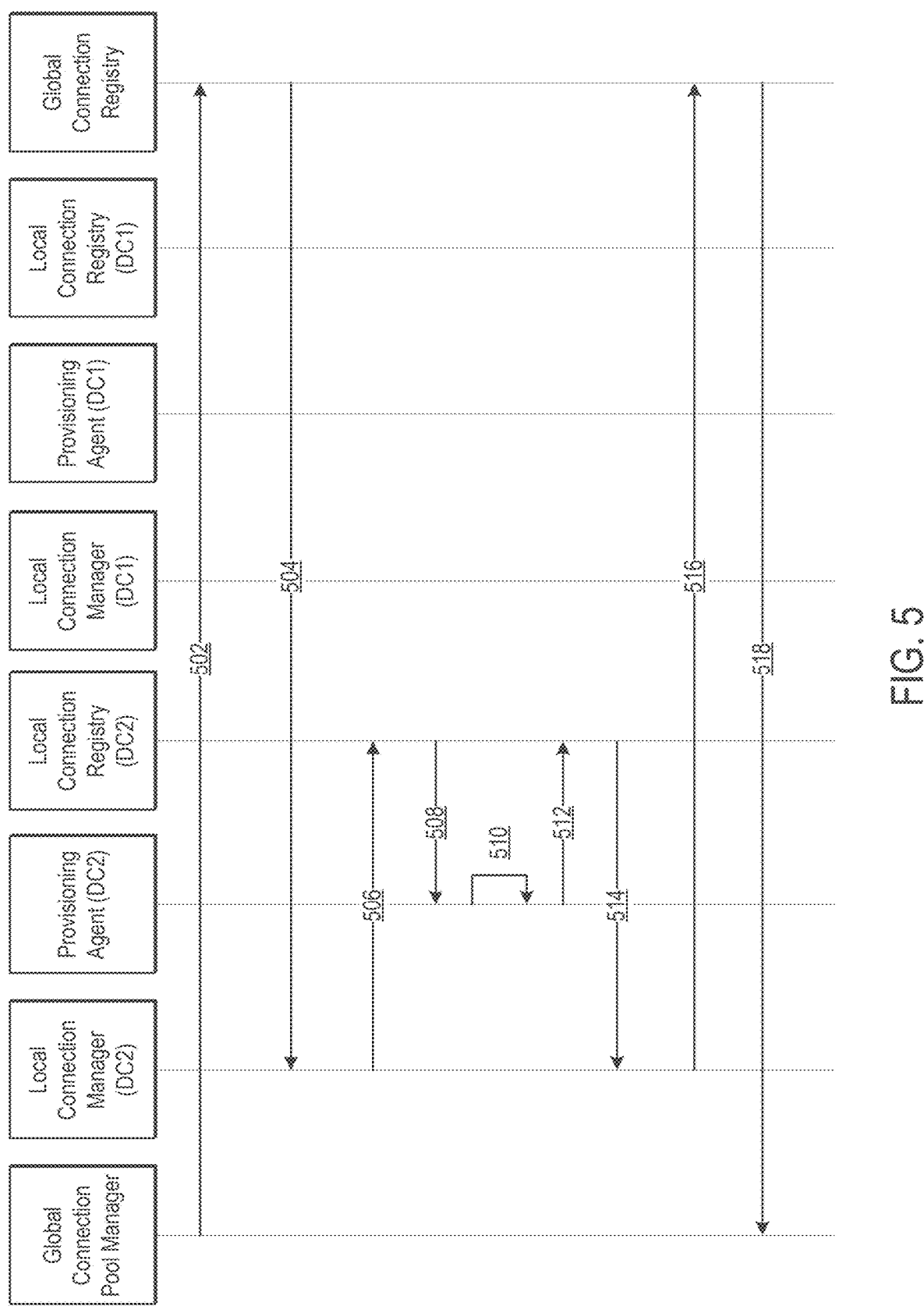
FIGS. 5 and 6 are sequence diagrams illustrating a method for transferring an active connection from a donor data center to a receiving data center according to some of the disclosed embodiments.
Figure 6:
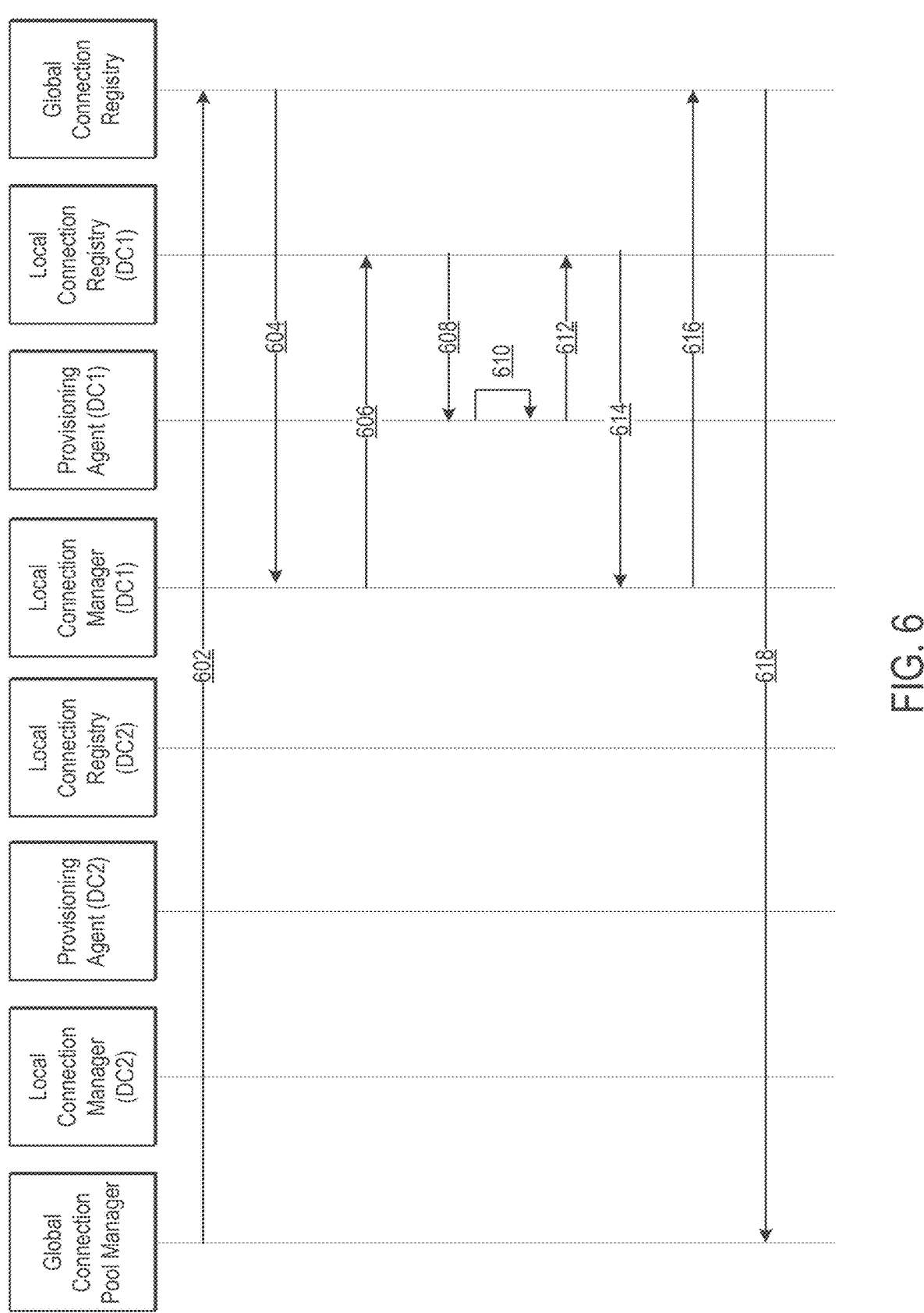

In FIGS. 5 and 6, a process is described whereby two connections originating from a donor data center (referred to as DC2) are recognized as contributors to the backlog of a specific network element (e.g., a UDR). These connections are subsequently relocated to a receiving data center (referred to as DC1).

The process begins in step 502, where a global connection pool manager determines that two connections should be redistributed. In some implementations, the global connection pool manager may identify that two connections, specifically sequence numbers four and five, must be relocated in a particular network element at DC2. In response to this determination, the global connection pool manager generates a connection assignment update and transmits it to the global connection registry. As previously discussed, a global connection manager decision function can be employed to analyze metrics across the network and send a request to the global connection registry for connection redistribution. Subsequently, the global connection registry may notify the global connection pool manager of the requested change. In response, the global connection pool manager may identify the specific connections requiring modification and transmit this change to the global connection registry as part of the updated connection assignments within step 502.

It should be noted that the method depicted in FIG. 4 may be executed before the process outlined in FIGS. 5 and 6. Specifically, the connection distribution decision function, operating as an elected leader, may propose a new state for the connections based on detected backlogs. As discussed earlier, this desired state is generated by the global connection registry based on the proposed connection assignments transmitted by the connection distribution decision function to the global connection registry. When the global connection registry identifies a discrepancy between the desired state and the actual state of connections, it sends a notification to the global connection pool managers at each data center. These global connection pool managers can then submit their proposed correction assignments to the global connection registry. Thus, in the context of step 502, the global connection pool manager may request its updated connection assignments for DC2 to continue this process. As another example, assuming that the connection distribution decision function at DC1 analyzes the metrics and determines that connections with sequence numbers four and five from DC2 should be redistributed, it will push this change to the global connection registry. Each global connection pool manager will query the global connection registry to assess whether the desired state matches the actual state. In some implementations, each data center's global connection pool manager will specifically monitor any impacts on its connections. If a global connection pool manager detects that connections need to be moved from its data center, it will initiate the updated connection assignments as indicated in step 502.

Following the updated connection assignments, step 504 involves the global connection registry sending a connection assignment update notification to the local connection manager at DC2. As previously explained, the local connection manager is responsible for monitoring local connection assignment changes within the global connection registry. In some implementations, the local connection manager functions as a consumer, while the global connection registry acts as a producer. To facilitate this, the local connection manager can utilize a PubSub connection to receive connection assignment update notifications pertaining to connections assigned to its local provisioning agent in DC2.

Upon receipt of a connection assignment update notification, the local connection manager proceeds to reconcile the identified changes in connections as indicated by the global connection registry. To achieve this, the local connection manager forwards a connection assignment to the local connection registry in step 506. As previously outlined, the local connection registry is responsible for managing connections within a data center for provisioning agents. It maintains both the current state of connections across provisioning agent instances and the desired state of connections across provisioning agent instances. In response to receiving the local connection assignments from the local connection manager, the local connection registry updates the desired state within the connection assignment registry. Through a comparison of the desired state and the current state, the local connection registry determines which connections require modification and specifies the necessary operations. For example, as detailed in step 502, the global connection pool manager identified the need to remove connections four and five. Consequently, in step 508, the local connection registry may transmit a connection assignment update notification that specifies the removal of these connections.

In response, in step 510, the provisioning agent of DC 2 takes action by closing the connections with sequence numbers 4 and 5. The specific details of closing a connection by provisioning agent are not described in detail herein. Any connection provisioning system may be used that can open and close and otherwise manage connections in the specific manner in which they are closed or opened is not limited. Once the provisioning agent completes closing the connections requested, it transmits, in step 512, an update to the local connection state to the local connection registry. As discussed, the local connection registry includes a connection state registry that contains the current state of connections. In response to this update, the local connection registry is modified to reflect the closure of connections with sequence numbers four and five. Following this update, the local connection pool manager may once again compare the desired state with the current state of connections to ensure that the provisioning agent's actions have resulted in a match between the two states. In some implementations, if the local pool manager does not detect a match after the provisioning agent takes action, the process, including steps 508, 510, and 512, may be repeated until the states are in alignment.

Upon confirming that the desired state and the current state are in sync, the local connection registry proceeds to transmit a connection state update notification to the local connection manager in step 514. It's worth noting that this notification in step 514 can be seen as a response to the initial request received in step 506 to update local connection assignments.

Upon receipt of the connection state update notification from the local connection registry, the local connection manager proceeds to transmit an updated connection state for DC2 to the global connection registry in step 516. This update can include the status of all connections established by the provisioning agents, or alternatively, it may only transmit a list of confirmed changes made by the provisioning agents, such as the closure of connection sequence numbers four and five.

In response to the updated connection state for DC2, the local connection pool manager updates the connection state registry to reflect the new state of connections. For instance, it removes connection sequence numbers 4 and 5 from the connection state registry. Finally, in step 518, the global connection registry transmits a connection state update notification to the global connection pool managers. In this example, the global connection pool manager determines that no further changes are needed for DC2 based on the differences between the desired state and the actual state. Initially, at the beginning of the process in FIG. 5, the discrepancy between the desired state and the actual state indicated that connection sequence numbers four and five should be moved from DC2 to DC1. However, at step 518, the discrepancy between the desired and actual state has progressed to an intermediate state where connections sequence numbers four and five are no longer at DC2 but have not yet reached DC1.

In this scenario, the global connection pool manager detects the discrepancy and, in step 602, issues another message to update the connection assignments for DC1. Specifically, the global connection pool manager sends a message to update the connections at DC1 by adding connection sequence numbers four and five.

In response, the global connection registry will send a connection assignment update notification to the local connection manager at DC1 in step 604. The details of this process are similar to those in step 504 and are not repeated here. However, the notification in step 604 will indicate to the local connection manager of DC1 that two new connections should be provisioned by the provisioning agent of DC1.

In response, the local connection manager at DC1 will send a command to the local connection registry at DC1 to update the local connection assignments for DC1. Specifically, the local connection manager will issue a command to add connection sequence numbers four and five to DC1. Further details on the format of this request in step 606 were previously provided in the description of step 506, and that description is not repeated here.

In response to the message in step 606, the local connection pool manager will compare the current state to the desired state and determine which connections need to be established. It will then transmit, in step 608, a connection assignment update notification to the provisioning agent of DC1 via the local connection registry. In response, the provisioning agent of DC1 will open new connections with sequence numbers four and five with the appropriate network element in step 610. After completing the opening of the connections, the provisioning agent will transmit an updated local connection state reflecting the added connections to the local connection registry for DC1 in step 612. Details of step 608, step 610, and step 612 are similar to those described in step 508, step 510, and step 512, respectively. Implementation details of those corresponding steps are not repeated herein.

In step 614, the local connection pool manager will confirm that the desired state and the actual state match. As discussed in the description of step 514, if the states do not match, the process of step 608, step 610, and step 612 may be repeated until the states match. Upon determining that the states match, the local connection registry will transmit a connection state update notification to the local connection manager, which acts as a response to the message received in step 606. In step 616, the local connection manager will transmit an updated connection state for DC1 to the global connection registry. This updated connection state may reflect the newly created connection sequence numbers four and five created by the provisioning agents. Implementation details of step 614 and 616 are similar to those described in step 514 and 516, which are not repeated herein.

In response, the global connection registry will update the current state of the connections across the networks. Since connection sequence numbers four and five were removed from DC2 and added to DC1, this constitutes a redistribution of the two connections. As discussed, the connection distribution decision function may have requested this redistribution of two connections based on the recorded metrics, and the global connection registry recorded this change as the desired state. After step 618, the global connection registry will have updated the global connection state to match the desired state. As such, in step 618, the global connection registry transmits a connection state update notification reflecting this match back to the global connection pool manager. At this point, the global connection pool manager will identify that no further changes are needed to implement the redistribution of connections.

The illustrated process involves moving two connections from one data center to another. When used in combination with the process in FIGS. 5 and 6, this process can be fully automated, eliminating the need for manual intervention to move connections between data centers. The use of a global shared connection registry in conjunction with local connection registries and connection managers ensures that the sequence of events is coordinated and reliable.

Figure 7:
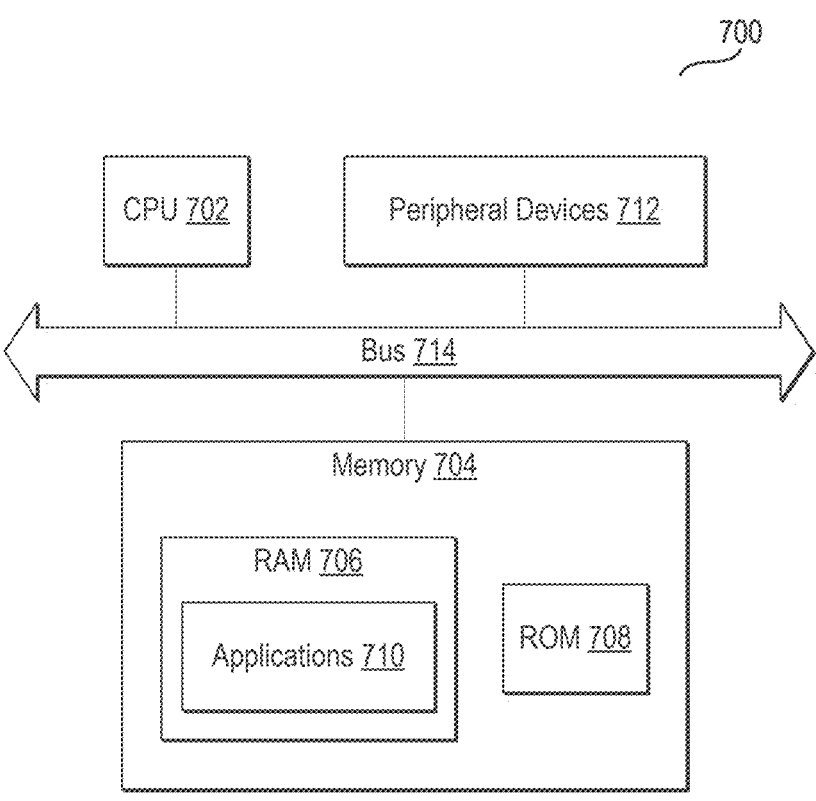
FIG. 7 is a block diagram of a computing device according to some embodiments of the disclosure.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

recording performance metrics associated with network connections between network elements in a centralized database;

storing data representing a plurality of network connections in a global connection registry, the plurality of network connections provisioned by a plurality of data centers;

detecting, using a connection distribution decision function, a backlog at a first data center, the backlog associated with a network element and a network connection selected from the plurality of network connections, wherein the connection distribution decision function comprises a function distributed in the first data center and the second data center elected via a leader election algorithm;

generating an updated connection assignment for the network connection, the updated connection assignment including an identifier of the first data center, an identifier of the network connection, and an identifier of the second data center;

receiving a connection assignment update notification from the global connection registry;

updating the network connection in response to the connection assignment update notification; and transmitting a connection state of the first data center to the global connection registry after updating the network connection and in response to the connection assignment update notification.

2. The method of claim 1, wherein the performance metrics comprise one or more of a queue count of connection requests for each network element, a throughput measurement of each network element, and an average time to complete connection requests for each network element.

3. The method of claim 2, wherein detecting the backlog comprises:

retrieving a subset of the performance metrics from the centralized database; and analyzing the subset of the performance metrics to compute the backlog based on one or more of the queue count, throughput, or average time to complete connection requests for network elements connected to the first data center.

4. The method of claim 1, wherein generating an updated connection assignment comprises identifying the second data center based on a provisioning volume of the second data center via the connection distribution decision function.

5. The method of claim 1, wherein updating the network connection in response to the connection assignment update notification comprises:

instructing a local connection registry of the first data center to update a desired connection state;

updating the network connection via a provisioning agent;

updating a local connection state of the first data center;

determining that the local connection state matches the desired connection state; and transmitting a connection state update notification to a local connection manager indicating that the network connection was successfully updated.

6. The method of claim 1, further comprising:

computing a global connection state using the connection state of the first data center;

comparing a desired global connection state to the global connection state and identifying at least one mismatch;

transmitting a second connection assignment update notification to the second data center; and updating at least one second connection at the second data center responsive to the second connection assignment update notification.

7. The method of claim 1, wherein the network connections between network elements include network connections between a user data repository (UDR) and one or more of a unified data management (UDM) network element, access and mobility management function (AMF) network element, session management function (SMF) network element, network exposure function (NEF) network element, policy control function (PCF), or application function (AF) network element.

8. The method of claim 1, wherein the connection distribution decision function employs a predictive model comprising a machine learning model including a neural network to proactively anticipate network connection backlog and generate the updated connection assignment based on the anticipated network connection backlog.

9. The method of claim 1, wherein generating the updated connection assignment comprises determining a number of connections associated with the network element to be redistributed and selecting a subset of connections of the network element for redistribution to the second data center.

10. The method of claim 1, wherein generating the updated connection assignment comprises simulating an impact on capacity and demand resulting from removal of the network connection from the first data center, determining, based on the simulating, an optimal number of connections to be redistributed from the first data center to achieve a target throughput, and reevaluating a ranking of the plurality of data centers to account for potential consequences on future connection redistributions.

11. A non-transitory computer-readable storage medium for tangibly storing computer program instructions capable of being executed by a computer processor, the computer program instructions defining steps of:

recording performance metrics associated with network connections between network elements in a centralized database;

storing data representing a plurality of network connections in a global connection registry, the plurality of network connections provisioned by a plurality of data centers;

detecting, using a connection distribution decision function, a backlog at a first data center, the backlog associated with a network element and a network connection selected from the plurality of network connections, wherein the connection distribution decision function comprises a function distributed in the first data center and the second data center elected via a leader election algorithm;

generating an updated connection assignment for the network connection, the updated connection assignment including an identifier of the first data center, an identifier of the network connection, and an identifier of the second data center;

receiving a connection assignment update notification from the global connection registry;

updating the network connection in response to the connection assignment update notification; and transmitting a connection state of the first data center to the global connection registry after updating the network connection and in response to the connection assignment update notification.

12. The non-transitory computer-readable storage medium of claim 11, wherein the performance metrics comprise one or more of a queue count of connection requests for each network element, a throughput measurement of each network element, and an average time to complete connection requests for each network element.

13. The non-transitory computer-readable storage medium of claim 12, wherein detecting the backlog comprises:

retrieving a subset of the performance metrics from the centralized database; and analyzing the subset of the performance metrics to compute the backlog based on one or more of the queue count, throughput, or average time to complete connection requests for network elements connected to the first data center.

14. The non-transitory computer-readable storage medium of claim 11, wherein generating an updated connection assignment comprises identifying the second data center based on a provisioning volume of the second data center via the connection distribution decision function.

15. The non-transitory computer-readable storage medium of claim 11, wherein updating the network connection in response to the connection assignment update notification comprises:

instructing a local connection registry of the first data center to update a desired connection state;

updating the network connection via a provisioning agent;

updating a local connection state of the first data center;

determining that the local connection state matches the desired connection state; and transmitting a connection state update notification to a local connection manager indicating that the network connection was successfully updated.

16. The non-transitory computer-readable storage medium of claim 11, the steps further comprising:

computing a global connection state using the connection state of the first data center;

comparing a desired global connection state to the global connection state and identifying at least one mismatch;

transmitting a second connection assignment update notification to the second data center; and updating at least one second connection at the second data center responsive to the second connection assignment update notification.

17. A device comprising:

a processor configured to:

record performance metrics associated with network connections between network elements in a centralized database;

store data representing a plurality of network connections in a global connection registry, the plurality of network connections provisioned by a plurality of data centers;

detect, using a connection distribution decision function, a backlog at a first data center, the backlog associated with a network element and a network connection selected from the plurality of network connections, wherein the connection distribution decision function comprises a function distributed in the first data center and the second data center elected via a leader election algorithm;

generate an updated connection assignment for the network connection, the updated connection assignment including an identifier of the first data center, an identifier of the network connection, and an identifier of the second data center;

receive a connection assignment update notification from the global connection registry;

update the network connection in response to the connection assignment update notification; and transmit a connection state of the first data center to the global connection registry after updating the network connection and in response to the connection assignment update notification.

18. The device of claim 17, wherein the performance metrics comprise one or more of a queue count of connection requests for each network element, a throughput measurement of each network element, and an average time to complete connection requests for each network element.

19. The device of claim 18, wherein detecting the backlog comprises:

retrieving a subset of the performance metrics from the centralized database; and analyzing the subset of the performance metrics to compute the backlog based on one or more of the queue count, throughput, or average time to complete connection requests for network elements connected to the first data center.

20. The device of claim 17, wherein updating the network connection in response to the connection assignment update notification comprises:

instructing a local connection registry of the first data center to update a desired connection state;

updating the network connection via a provisioning agent;

updating a local connection state of the first data center;

determining that the local connection state matches the desired connection state; and transmitting a connection state update notification to a local connection manager indicating that the network connection was successfully updated.

* * * * *